(12) United States Patent
Saito et al.

(10) Patent No.: US 10,307,736 B2
(45) Date of Patent: Jun. 4, 2019

(54) EXHAUST GAS PURIFICATION CATALYST

(71) Applicants: Yoshinori Saito, Toyota (JP);
Hiromasa Suzuki, Toyota (JP);
Tatsuya Ohashi, Kakegawa (JP);
Keiichi Narita, Kakegawa (JP); Ryota Nakashima, Kakegawa (JP);
Mitsuyoshi Okada, Kakegawa (JP);
Ryosuke Takasu, Kakegawa (JP);
Shunsuke Oishi, Kakegawa (JP)

(72) Inventors: Yoshinori Saito, Toyota (JP);
Hiromasa Suzuki, Toyota (JP);
Tatsuya Ohashi, Kakegawa (JP);
Keiichi Narita, Kakegawa (JP); Ryota Nakashima, Kakegawa (JP);
Mitsuyoshi Okada, Kakegawa (JP);
Ryosuke Takasu, Kakegawa (JP);
Shunsuke Oishi, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 15/936,980

(22) Filed: Mar. 27, 2018

(65) Prior Publication Data
US 2018/0304238 A1     Oct. 25, 2018

(30) Foreign Application Priority Data

Apr. 19, 2017   (JP) ................................ 2017-082716

(51) Int. Cl.
*B01J 23/42*     (2006.01)
*B01J 23/44*     (2006.01)
(Continued)

(52) U.S. Cl.
CPC .......... *B01J 23/464* (2013.01); *B01D 53/945* (2013.01); *B01D 53/9468* (2013.01); *B01J 23/44* (2013.01);
(Continued)

(58) Field of Classification Search
CPC .......... B01J 23/42; B01J 23/44; B01J 23/464; B01J 23/56; B01J 35/0006
See application file for complete search history.

(56) References Cited

U.S. PATENT DOCUMENTS 6,047,544 A * 4/2000 Yamamoto ........... B01D 53/945
                                                              422/171
6,080,375 A * 6/2000 Mussmann ........... B01D 53/944
                                                              423/212
(Continued)

FOREIGN PATENT DOCUMENTS

JP            6-205983 A        7/1994
JP       2009-273986 A       11/2009
(Continued)

OTHER PUBLICATIONS

Jan. 17, 2019 Office Action dated in U.S. Appl. No. 16/151,847.
U.S. Appl. No. 16/151,847 filed in the name of Hiromasa Suzuki et al.

*Primary Examiner* — Cam N. Nguyen
(74) *Attorney, Agent, or Firm* — Oliff PLC

(57) ABSTRACT

An exhaust gas purification catalyst, excellent in the NOx purification capacity and the HC purification capacity, includes a substrate and a catalyst coating layer formed on the surface of the substrate, wherein the catalyst coating layer comprises the upper and lower layer including a lower layer being closer to the surface of the substrate and an upper layer being relatively remote from the surface of the substrate. The upper layer of the catalyst coating layer includes Rh, Pd, and a carrier. The lower layer of the catalyst coating (Continued)

layer includes at least one noble metal selected from Pd and Pt and a carrier. 65% by mass or more of Pd in the upper layer exists in a layer up to 50% of the upper layer in a thickness direction from the surface of the upper layer being relatively remote from the surface of the substrate. The ratio of Pd to Rh by mass (Pd/Rh) is 0.5 to 7.0 in the upper layer.

2 Claims, 5 Drawing Sheets

(51) Int. Cl.
    *B01J 23/56* (2006.01)
    *B01J 35/00* (2006.01)
    *B01J 23/46* (2006.01)
    *B01J 37/02* (2006.01)
    *B01J 37/08* (2006.01)
    *B01D 53/94* (2006.01)
    *F01N 3/10* (2006.01)

(52) U.S. Cl.
    CPC ....... *B01J 35/0006* (2013.01); *B01J 37/0236* (2013.01); *B01J 37/0244* (2013.01); *B01J 37/088* (2013.01); *F01N 3/101* (2013.01); *B01D 2255/1021* (2013.01); *B01D 2255/1023* (2013.01); *B01D 2255/1025* (2013.01); *B01D 2255/9025* (2013.01)

(56) References Cited

U.S. PATENT DOCUMENTS

| | | | | |
|---|---|---|---|---|
| 7,517,510 B2* | 4/2009 | Chen | ................... | B01D 53/945 422/168 |
| 7,524,465 B2* | 4/2009 | Kumar | ................... | B01J 23/44 422/180 |
| 7,749,472 B2* | 7/2010 | Chen | ................... | B01D 53/945 423/213.2 |
| 7,998,896 B2* | 8/2011 | Kitamura | ............ | B01D 53/945 422/180 |
| 8,165,560 B2 | 4/2012 | Stenquist | | |
| 8,168,560 B2* | 5/2012 | Taki | ................... | B01J 37/0244 423/213.5 |
| 8,309,488 B2* | 11/2012 | Kitamura | ............ | B01D 53/945 502/304 |
| 8,663,588 B2* | 3/2014 | Lindner | ............. | B01D 53/945 423/213.5 |
| 8,796,172 B2* | 8/2014 | Chinzei | ............... | B01D 53/945 502/262 |
| 8,950,174 B2* | 2/2015 | Hilgendorff | ............ | B01J 23/58 423/213.2 |
| 9,242,242 B2* | 1/2016 | Hilgendorff | ............. | B01J 23/58 |
| 9,517,462 B2* | 12/2016 | Roesch | ................ | B01D 53/945 |
| 9,579,633 B2* | 2/2017 | Suzuki | .............. | B01D 53/9468 |
| 9,579,638 B2* | 2/2017 | Fedeyko | ............. | B01D 53/8628 |
| 9,993,804 B2* | 6/2018 | Saito | ....................... | B01J 37/08 |
| 2014/0357480 A1 | 12/2014 | Aoki | | |
| 2018/0236401 A1* | 8/2018 | Chinzei | ............... | B01J 37/0244 |

FOREIGN PATENT DOCUMENTS

| | | |
|---|---|---|
| JP | 2012-040547 A | 3/2012 |
| JP | 2013-136032 A | 7/2013 |
| JP | 2016-513014 A | 5/2016 |
| WO | 2014-132034 A1 | 9/2014 |

* cited by examiner

EXHAUST GAS PURIFICATION CATALYST

CROSS REFERENCE TO RELATED APPLICATIONS

The present application claims priority from Japanese patent application JP 2017-082716 filed on Apr. 19, 2017, the content of which is hereby incorporated by reference into this application.

BACKGROUND

Technical Field

This disclosure relates to an exhaust gas purification catalyst.

Background Art

An exhaust gas purification catalyst of an automobile oxidizes hydrocarbon (HC) and carbon monoxide (CO) contained in an exhaust gas discharged from an automobile engine, converts such substances into water and carbon dioxide, and reduces a nitrogen oxide (NOx) in an exhaust gas into nitrogen. As an exhaust gas purification catalyst having such catalytic activity (hereafter, it is also referred to as a "three-way catalyst"), in general, a noble-metal-carrying catalyst comprising a thermostable substrate coated with a catalyst layer comprising particles of catalytic noble metals, such as palladium (Pd), Rhodium (Rh), and platinum (Pt), is used.

For example, JP 2013-136032 A discloses an exhaust gas purification catalyst comprising a substrate and a catalyst coating layer formed on the surface of the substrate. The catalyst coating layer is in the form of a layered structure having upper and lower layer with a lower layer being closer to the surface of the substrate and an upper layer being relatively remote from the surface of the substrate. The catalyst coating layer comprises Rh and Pd as noble metal catalysts, and it comprises a material having the oxygen storage capacity (OSC) as a carrier. Rh is disposed in the upper layer of the catalyst coating layer, and Pd is disposed in both the upper layer and the lower layer of the catalyst coating layer. In the upper layer and the lower layer, at least a part of Pd is carried on the OSC material, and a ratio of Pd disposed in the upper layer relative to Pd disposed in the lower layer by mass is not more than 0.4. With the use of the exhaust gas purification catalyst disclosed in JP 2013-136032 A, the oxygen storage capacity (OSC) of the whole catalyst is considered to be effectively improved without deteriorating the NOx purification capacity.

However, it remains impossible to achieve both the high NOx purification capacity and the high HC purification capacity with the use of the exhaust gas purification catalyst according to conventional techniques as described above.

SUMMARY

Accordingly, this disclosure provides an exhaust gas purification catalyst that is excellent in terms of both the NOx purification capacity and the HC purification capacity.

The inventors of this disclosure have examined various means and, as a result, they discovered that both the high NOx purification capacity and the high HC purification capacity could be achieved by disposing Pd in particular areas in the upper layer of the catalyst and adjusting the Pd/Rh ratio in the upper layer of the catalyst within a particular range. This has led to the completion of this disclosure.

Specifically, this disclosure is summarized as follows.

[1] An exhaust gas purification catalyst comprising a substrate and a catalyst coating layer formed on the surface of the substrate,
wherein the catalyst coating layer comprises the upper and lower layer comprising a lower layer being closer to the surface of the substrate and an upper layer being relatively remote from the surface of the substrate,
the upper layer of the catalyst coating layer comprises Rh and Pd, and a carrier,
the lower layer of the catalyst coating layer comprises at least one noble metal selected from Pd and Pt, and a carrier,
65% by mass or more of Pd in the upper layer exists in a layer up to 50% of the upper layer in a thickness direction from the surface of the upper layer being relatively remote from the surface of the substrate, and
the ratio of Pd to Rh by mass (Pd/Rh) in the upper layer is 0.5 to 7.0.

[2] The exhaust gas purification catalyst according to claim 1, wherein 85% by mass or more of Pd in the upper layer exists in a layer up to 50% of the upper layer in a thickness direction from the surface of the upper layer being relatively remote from the surface of the substrate.

Effects

The exhaust gas purification catalyst according to this disclosure is excellent in the NOx purification capacity and in the HC purification capacity.

DETAILED DESCRIPTION

Figure 1:
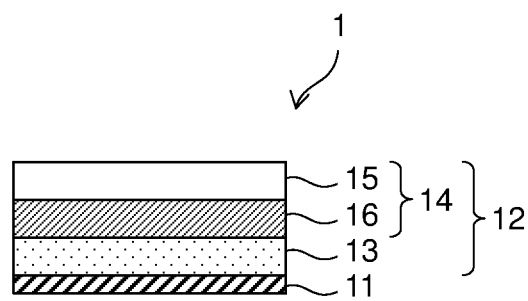
FIG. 1 shows an embodiment of this disclosure.

Hereafter, preferable embodiments of this disclosure are described in detail.

In this description, features of this disclosure are described with reference to relevant drawings. In the drawings, dimensions and configurations of components are exaggerated for clarification, and actual dimensions and configurations are not accurately demonstrated. Accordingly, the technical scope of this disclosure is not limited to the dimensions and the configurations of the components demonstrated in the drawings.

This disclosure relates to an exhaust gas purification catalyst. Specifically, this disclosure relates to an exhaust gas purification catalyst comprising a substrate and a catalyst coating layer formed on the surface of the substrate, wherein the catalyst coating layer comprises the upper and lower layer comprising a lower layer being closer to the surface of the substrate and an upper layer being relatively remote from the surface of the substrate, the upper layer of the catalyst coating layer comprises Rh, Pd, and a carrier, the lower layer of the catalyst coating layer comprises at least one noble metal selected from Pd and Pt and a carrier, 65% by mass or more of Pd in the upper layer exists in a layer up to 50% of the upper layer in a thickness direction from the surface of the upper layer being relatively remote from the surface of the substrate, and the ratio of Pd to Rh by mass (Pd/Rh) is 0.5 to 7.0 in the upper layer (hereafter, it is also referred to as the "catalyst of this disclosure"). The inventors of this disclosure discovered the optimal Pd disposition and the Pd/Rh ratio that would enable the improved HC purification capacity without deteriorating the NOx purification capacity.

FIG. 1 schematically shows a structure of the catalyst according to an embodiment of this disclosure. A catalyst 1 of this disclosure comprises a substrate 11 and a catalyst coating layer 12 formed on the surface of the substrate. The catalyst coating layer 12 comprises the upper and lower layer with a lower layer 13 being closer to the surface of the substrate and an upper layer 14 being relatively remote from the surface of the substrate. The upper layer 14 is composed of a layer 15 up to 50% of the upper layer in a thickness direction from the surface of the upper layer being relatively remote from the surface of the substrate (hereafter, it is also referred to as a "surface layer") and a layer 16 up to 50% of the upper layer in a thickness direction from the surface of the upper layer being relatively closer to the surface of the substrate.

The catalyst of this disclosure comprises a substrate and a catalyst coating layer formed on the surface of the substrate. The substrate is preferably in a honeycomb, pellet, or particle form, and a monolith substrate of a honeycomb structure is more preferable. Also, the substrate preferably comprises a thermostable inorganic matter such as cordierite or metal. With the use of a substrate having features described above, the exhaust gas purification capacity can be exerted at high temperatures. The wording "per liter of the substrate volume" used herein refers to an amount relative to a bulk volume of 1 liter of the whole including the pure volume of the substrate and the volume of a cell pathway. The amount indicated with "(g/l)" below indicates an amount contained in 1 liter of the substrate volume.

Regarding the catalyst of this disclosure, the catalyst coating layer comprises the upper and lower layer comprising a lower layer being closer to the surface of the substrate and an upper layer being relatively remote from the surface of the substrate, the upper layer of the catalyst coating layer comprises Rh and Pd, and a carrier, and the lower layer of the catalyst coating layer comprises at least one noble metal selected from Pd and Pt and a carrier. The upper layer is preferably the uppermost layer of the catalyst coating layer, and the upper layer is preferably in contact with the lower layer. Pd and Pt primarily contribute to performance of carbon monoxide (CO) purification and hydrocarbon (HC) purification (the oxidative purification capacity). Rh primarily contributes to performance of NOx purification (the reducing purification capacity).

In the catalyst of this disclosure, the lower layer of the catalyst coating layer comprises at least one noble metal selected from Pd and Pt and a carrier. The lower layer of the catalyst coating layer may comprise other noble metals, such as ruthenium (Ru), iridium (Jr), osmium (Os), or rhodium (Rh), provided that performance of Pd or Pt is not adversely affected.

A carrier to be incorporated into the lower layer is not particularly limited, provided that such carrier can be used for a common exhaust gas purification catalyst. For example, use of an OSC material having the oxygen storage capacity as disclosed in JP 2013-136032 A as a carrier is preferable. When the air-fuel ratio of an exhaust gas is lean (i.e., a hyperoxic atmosphere), an OSC material stores oxygen in the exhaust gas. When the air-fuel ratio of an exhaust gas is rich (i.e., an excess fuel atmosphere), in contrast, an OSC material discharges the stored oxygen. Examples of such OSC materials include cerium oxide (ceria: $CeO_2$) and a composite oxide containing ceria, such as a ceria-zirconia composite oxide (a $CeO_2$—$ZrO_2$ composite oxide). When the lower layer contains Pd, barium (Ba) may be added to the carrier. With the addition of Ba to the carrier of the lower layer, poisoning of Pd by HC can be suppressed, and catalytic activity can be enhanced. Also, use of a material with a high specific surface area is preferable since the carrier comprises a noble metal such as Pd carried thereon.

A total content of at least one noble metal selected from Pd and Pt in the lower layer is not particularly limited, provided that sufficient catalytic activity is achieved, and a necessary amount thereof can be added.

The lower layer may be formed by coating the surface of the substrate (e.g., a honeycomb substrate) with a slurry containing carrier particles and allowing Pd or the like to be carried thereon. Alternatively, the substrate surface may be coated with a slurry containing catalyst powders of Pd or the like carried on the carrier particles.

A noble metal such as Pd may be carried on the carrier of the lower layer by any method without particular limitation. For example, carrier particles containing OSC materials may be impregnated with an aqueous solution containing palladium salt (e.g., nitrate salt) or a palladium complex (e.g., a tetraammine complex).

In the step of forming the lower layer via coating, the slurry preferably contains a binder so as to adequately adhere the slurry to the substrate surface. Use of a binder, such as alumina sol or silica sol, is preferable. Slurry viscosity is adequately adjusted, so that the slurry can easily flow into cells of the substrate (e.g., a honeycomb substrate).

While the amount of the lower layer formed (i.e., the amount of coating) is not particularly limited, for example, such amount is preferably about 40 g to 200 g per liter of the substrate volume. Thus, the carried noble metal particles can be prevented from growing, and an increase in pressure loss occurring when an exhaust gas passes through the cells of the substrate can be prevented.

While the conditions for drying the slurry applied on the substrate surface vary depending on the configuration and the dimensions of the substrate or carrier, typically, dehydration is carried out at about 80° C. to 150° C. (e.g., 100° C. to 130° C.) for about 1 to 10 hours and calcining is carried out at about 300° C. to 800° C. (e.g., 400° C. to 600° C.) for about 1 to 4 hours.

Regarding the catalyst of this disclosure, the upper layer of the catalyst coating layer comprises Rh and Pd, and a carrier. The upper layer of the catalyst coating layer may comprise other noble metals, such as platinum (Pt), ruthenium (Ru), iridium (Jr), and osmium (Os), provided that performance of Rh and Pd is not adversely affected.

In order to achieve both the NOx purification capacity and the HC purification capacity, the catalyst of this disclosure comprises, in the surface layer, 65% by mass or more, preferably 85% by mass or more, and more preferably 90% by mass or more of Pd in the upper layer. The amount of Pd in the surface layer can be determined by measuring the PGM distribution in the upper layer of the catalyst coating layer with the use of a field-emission electron probe microanalyzer (FE-EPMA). For example, such amount can be determined by the method described in the section [II-1. Physical property evaluation] below.

In order to achieve both the NOx purification capacity and the HC purification capacity, also, the catalyst of this disclosure comprises Pd and Rh at a ratio of Pd to Rh by mass (Pd/Rh) of 0.5 to 7.0, preferably 0.5 to 6.4, more preferably 0.5 to 3.0 in the upper layer of the catalyst coating layer. The NOx purification capacity and the HC purification capacity can be improved by disposing a particular amount of Pd relative to Rh in the upper layer where the catalyst sufficiently contacts with a gas. The ratio of Pd to Rh by mass (Pd/Rh) can be determined based on the proportion of the amount of Pd adsorbed in the upper layer to the amount of Rh carried on the upper layer. For example, such amount can be determined by the method described in the section [II-1. Physical property evaluation] below.

A carrier to be incorporated into the upper layer is not particularly limited, provided that it can be used for a common exhaust gas purification catalyst. For example, zirconia ($ZrO_2$), alumina ($Al_2O_3$), a solid solution thereof, or a composite oxide thereof as disclosed in JP 2013-136032 A is preferably used as a carrier. For example, a $ZrO_2$-containing carrier is preferable. Rh carried on $ZrO_2$ generates hydrogen from HC in the exhaust gas through a hydrogen reforming reaction. Because of the reduction power of hydrogen, NOx in the exhaust gas is purified more sufficiently. A carrier to be incorporated into the upper layer of the catalyst coating layer may comprise a carrier material other than a $ZrO_2$ composite oxide. Examples of preferable carrier materials include metal oxides that are porous and thermostable. For example, use of $Al_2O_3$ is preferable. $Al_2O_3$ has a larger specific area and higher tolerance (thermostability, in particular), compared with a $ZrO_2$ composite oxide. By allowing Rh to be carried on $Al_2O_3$, accordingly, thermostability of the entire carrier can be improved, and an adequate amount of Rh can be carried on the entire carrier. While a carrier to be incorporated into the upper layer of the catalyst coating layer may comprise $CeO_2$ so as to achieve the oxygen storage capacity, a smaller amount thereof is preferable, so that NOx activity of Rh would not be deteriorated. Alternatively, a carrier may not comprise $CeO_2$.

The Pd content in the upper layer is preferably 0.025 to 1.5 g/l, and more preferably 0.05 g/l to 0.8 g/l, relative to the substrate volume, so as to achieve the sufficient catalytic activity. The Pd content in the surface layer of the catalyst coating layer is preferably 0.016 g/l to 0.975 g/l, and more preferably 0.03 g/l to 0.52 g/l, relative to the substrate volume, so as to achieve the sufficient catalytic activity.

The upper layer may be formed by coating the surface of the lower layer with a slurry containing carrier particles comprising Rh carried thereon, and allowing the resultant to absorb an aqueous solution containing palladium salt (e.g., nitrate salt) or a palladium complex (e.g., a tetraammine complex). Thus, Pd is carried thereon. Pd may be carried on the upper layer surface via coating, impregnation, spraying, or other means. An aqueous solution of Pd can be prepared with the addition of nitric acid to a Pd solution (an acid species is not limited and acetic acid, citric acid, or the like may also be added). The amount of Pd carried on the upper layer can be adjusted by adequately regulating a pH level of the aqueous solution of Pd. In general, adsorption of Pd to the material constituting the upper layer is inhibited by lowering a pH level, and the aqueous solution of Pd can penetrate deep in the upper layer. By lowering a pH level of the aqueous solution of Pd to 1 or lower, accordingly, the upper layer can carry Pd in a manner such that about 65% of Pd by mass in the upper layer can be disposed in the surface layer. When a pH level of the aqueous solution of Pd is regulated within a range from 1 to 2, adsorption of Pd to the material constituting the upper layer is not inhibited. As a consequence, the upper layer can carry Pd in a manner such that about 85% to 90% of Pd by mass in the upper layer can be disposed in the surface layer.

Rh may be carried on the carrier of the upper layer by any method without particular limitation. For example, carrier particles containing a $ZrO_2$ composite oxide may be allowed to impregnate into an aqueous solution containing rhodium salt (e.g., nitrate salt) or a rhodium complex (e.g., a tetraammine complex).

In the step of forming the upper layer via coating, the slurry preferably contains a binder so as to adequately adhere the slurry to the surface of the lower layer. Use of a binder, such as alumina sol or silica sol, is preferable. Slurry viscosity is adequately adjusted, so that the slurry can easily flow into cells of the substrate (e.g., a honeycomb substrate).

While the amount of the upper layer formed (i.e., the amount of coating) is not particularly limited, for example, such amount is preferably about 20 g to 200 g per liter of the substrate volume. Thus, the carried Rh and Pd particles can be prevented from growing, and an increase in pressure loss occurring when an exhaust gas passes through the cells of the substrate can be prevented.

While the conditions for drying the slurry applied on the lower layer surface vary depending on the configuration and the dimensions of the substrate or carrier, typically, dehydration is carried out at about 80° C. to 150° C. (e.g., 100° C. to 130° C.) for about 1 to 10 hours and calcining is carried out at about 300° C. to 800° C. (e.g., 400° C. to 600° C.) for about 1 to 4 hours.

The catalyst of this disclosure provides the NOx purification ratio at 500° C. of preferably 97.75% or higher, and more preferably 98.4% or higher, after the tolerance test. Also, the catalyst of this disclosure provides the HC purification ratio at 500° C. of preferably 73.9% or higher, and more preferably 77.0% or higher, after the tolerance test. The NOx purification ratio and the HC purification ratio can be determined by, for example, the method described in the section [II-3. Property evaluation] below.

The "tolerance test" is carried out by exposing a catalyst or the like, which is a test subject, to the exhaust gas atmosphere resulting from combustion of a mixed gas or the gas atmosphere having a gas composition simulating such exhaust gas at about 800° C. to 1,100° C. for 1 to 70 hours. In general, the "tolerance test" is carried out to evaluate tolerance of an exhaust gas purification catalyst. The "tolerance test" can be carried out by, for example, the method described in the section [II-2. Tolerance test] below.

EXAMPLES

Hereafter, this disclosure is described in greater detail with reference to the following examples, although the technical scope of this disclosure is not limited to these examples.

<I. Preparation of Catalyst>
[I-1. Raw Materials]
(1) Raw Materials Used as Carriers are as Described Below.
Material 1 ($Al_2O_3$)
An $La_2O_3/Al_2O_3$-composite was used ($La_2O_3$: 1 wt % to 10 wt %).
Material 2 (ACZ)
An $Al_2O_3$—$CeO_2$—$ZrO_2$ composite oxide was used ($CeO_2$: 15 wt % to 30 wt %), which was made highly thermostable with the addition of very small amounts of $Nd_2O_3$, $La_2O_3$, and $Y_2O_3$.
Material 3 (CZ)
A $CeO_2$—$ZrO_2$ composite oxide was used. From the viewpoint of OSC properties, 1 wt % to 10 wt % of $Pr_2O_3$ was added thereto.
(2) Raw Materials Used as Substrate are as Described Below.
A 875-cc cordierite honeycomb substrate (a 600-cell hexagonal substrate; wall thickness: 2 miliinches (mil)) was used.
[I-2. Preparation of Catalyst]

Comparative Example 1

Lower layer: Pd (0.23)+ACZ (45)+$Al_2O_3$ (40)+Ba sulfate (5)+CZ (10)
Upper layer: Rh (0.11)+ACZ (100)+$Al_2O_3$ (30)
A suspension [Slurry 1] was prepared by introducing Pd nitrate, ACZ (Material 2), $Al_2O_3$ (Material 1), Ba sulfate, Material 3, and an $Al_2O_3$-based binder.
The prepared [Slurry 1] was introduced into the substrate, and unnecessary components were blown away using a blower to coat the wall surface of the substrate. The amounts of coating materials were as follows: 0.23 g/l of Pd, 45 g/l of ACZ (Material 2), 40 g/l of $Al_2O_3$ (Material 1), 5 g/l of Ba sulfate, and 10 g/l of CZ (Material 3), relative to the substrate volume. In the end, the resultant was dried in a dryer maintained at 120° C. for 2 hours and then calcined in an electric furnace at 500° C. for 2 hours. Thus, the lower layer was formed.
A suspension [Slurry 2] was prepared by introducing Rh nitrate, ACZ (Material 2), $Al_2O_3$ (Material 1), and an $Al_2O_3$-based binder.
The prepared [Slurry 2] was introduced into the substrate comprising the lower layer formed thereon, and unnecessary components were blown away using a blower to coat the upper layer. The amounts of coating materials were as follows: 0.11 g/l of Rh, 100 g/l of ACZ (Material 2), and 30 g/l of $Al_2O_3$ (Material 1), relative to the substrate volume. In the end, the resultant was dried in a dryer maintained at 120° C. for 2 hours and then calcined in an electric furnace at 500° C. for 2 hours. Thus, the catalyst was obtained.

Comparative Example 2

Lower layer: Pd (0.23)+ACZ (45)+$Al_2O_3$ (40)+Ba sulfate (5)+CZ (10)
Upper layer: Rh (0.11)+ACZ (100)+Pd (0.7)+$Al_2O_3$ (30)
The catalyst was obtained in the same manner as in Comparative Example 1, except that the step of preparing the Pd-containing [Slurry 3] was carried out instead of the step of preparing [Slurry 2] of Comparative Example 1.
A suspension [Slurry 3] was prepared by introducing Pd nitrate, ACZ (Material 2), Rh nitrate, $Al_2O_3$ (Material 1), and an $Al_2O_3$-based binder.
The prepared [Slurry 3] was introduced into a substrate comprising a lower layer formed thereon, and unnecessary components were blown away using a blower to coat the upper layer. The amounts of coating materials were as follows: 0.11 g/l of Rh, 0.7 g/l of Pd, 100 g/l of ACZ (Material 2), and 30 g/l of $Al_2O_3$ (Material 1), relative to the substrate volume. In the end, the resultant was dried in a dryer maintained at 120° C. for 2 hours and then calcined in an electric furnace at 500° C. for 2 hours. Thus, the catalyst was obtained.
In such a case, 50% of Pd in the upper layer exists in the surface layer (i.e., a layer up to 50% of the upper layer in a thickness direction from the surface of the upper layer being relatively remote from the surface of the substrate).

Comparative Example 3

Lower layer: Pd (0.23)+ACZ (45)+$Al_2O_3$ (40)+Ba sulfate (5)+CZ (10)
Upper layer: Rh (0.11)+ACZ (100)+$Al_2O_3$ (30)+Pd (1.2)
The catalyst was obtained in the same manner as in Comparative Example 1, except that Pd was carried on the substrate after the upper layer was coated in Comparative Example 1.
The upper layer coat dried and calcined in Comparative Example 1 was allowed to adsorb a Pd solution, and unnecessary components were blown away using a blower to have Pd carried thereon at 1.2 g/l. The resultant was dried in a dryer maintained at 120° C. for 2 hours and then calcined in an electric furnace at 500° C. for 2 hours. Thus, the catalyst was obtained. An upper layer containing Rh and Pd was prepared as a consequence. In such a case, a pH level of the Pd solution was adjusted to 1 to 2, so that about 90% of Pd would be disposed in the surface layer.

Comparative Example 4

Lower layer: Pd (0.23)+ACZ (45)+$Al_2O_3$ (40)+Ba sulfate (5)+CZ (10)
Upper layer: Rh (0.11)+ACZ (100)+Pd (0.055)+$Al_2O_3$ (30)
The catalyst was obtained in the same manner as in Comparative Example 2, except that the amounts of materials for upper layer coating relative to the substrate volume were as follows: 0.11 g/l of Rh, 0.055 g/l of Pd, 100 g/l of ACZ (Material 2), and 30 g/l of $Al_2O_3$ (Material 1).
In such a case, 50% of Pd in the upper layer exists in the surface layer (i.e., a layer up to 50% of the upper layer in a thickness direction from the surface of the upper layer being relatively remote from the surface of the substrate).

Comparative Example 5

Lower layer: Pd (0.23)+ACZ (45)+$Al_2O_3$ (40)+Ba sulfate (5)+CZ (10)
Upper layer: Rh (0.11)+ACZ (100)+Pd (0.20)+$Al_2O_3$ (30)
The catalyst was obtained in the same manner as in Comparative Example 2, except that the amounts of materials for upper layer coating relative to the substrate volume were as follows: 0.11 g/l of Rh, 0.20 g/l of Pd, 100 g/l of ACZ (Material 2), and 30 g/l of $Al_2O_3$ (Material 1).
In such a case, 50% of Pd in the upper layer exists in the surface layer (i.e., a layer up to 50% of the upper layer in a thickness direction from the surface of the upper layer being relatively remote from the surface of the substrate).

Example 1

Lower layer: Pd (0.23)+ACZ (45)+$Al_2O_3$ (40)+Ba sulfate (5)+CZ (10)
Upper layer: Rh (0.11)+ACZ (100)+$Al_2O_3$ (30)+Pd (0.7)
The catalyst was obtained in the same manner as in Comparative Example 1, except that Pd was carried on the substrate after the upper layer was coated in Comparative Example 1.

The upper layer coat dried and calcined in Comparative Example 1 was allowed to adsorb a Pd solution, and unnecessary components were blown away using a blower to have Pd carried thereon at 0.7 g/l. The resultant was dried in a dryer maintained at 120° C. for 2 hours and then calcined in an electric furnace at 500° C. for 2 hours. Thus, the catalyst was obtained. An upper layer containing Rh and Pd was prepared as a consequence. In such a case, a pH level of the Pd solution was adjusted to 1 or lower, so that about 65% of Pd by mass would be disposed in the surface layer.

Example 2

Lower layer: Pd (0.23)+ACZ (45)+$Al_2O_3$ (40)+Ba sulfate (5)+CZ (10)
Upper layer: Rh (0.11)+ACZ (100)+$Al_2O_3$ (30)+Pd (0.7)
The catalyst was obtained in the same manner as in Comparative Example 1, except that Pd was carried on the substrate after the upper layer was coated in Comparative Example 1.
The upper layer coat dried and calcined in Comparative Example 1 was allowed to adsorb a Pd solution, and unnecessary components were blown away using a blower to have Pd carried thereon at 0.7 g/l. The resultant was dried in a dryer maintained at 120° C. for 2 hours and then calcined in an electric furnace at 500° C. for 2 hours. Thus, the catalyst was obtained. An upper layer containing Rh and Pd was prepared as a consequence. In such a case, a pH level of the Pd solution was adjusted to 1 to 2, so that about 90% of Pd would be disposed in the surface layer.

Example 3

Lower layer: Pd (0.23)+ACZ (45)+$Al_2O_3$ (40)+Ba sulfate (5)+CZ (10)
Upper layer: Rh (0.11)+ACZ (100)+$Al_2O_3$ (30)+Pd (0.33)
The catalyst was obtained in the same manner as in Comparative Example 1, except that Pd was carried on the substrate after the upper layer was coated in Comparative Example 1.
The upper layer coat dried and calcined in Comparative Example 1 was allowed to adsorb a Pd solution, and unnecessary components were blown away using a blower to have Pd carried thereon at 0.33 g/l. The resultant was dried in a dryer maintained at 120° C. for 2 hours and then calcined in an electric furnace at 500° C. for 2 hours. Thus, the catalyst was obtained. An upper layer containing Rh and Pd was prepared as a consequence. In such a case, a pH level of the Pd solution was adjusted to 1 to 2, so that about 90% of Pd would be disposed in the surface layer.

Example 4

Lower layer: Pd (0.23)+ACZ (45)+$Al_2O_3$ (40)+Ba sulfate (5)+CZ (10)
Upper layer: Rh (0.11)+ACZ (100)+$Al_2O_3$ (30)+Pd (0.055)
The catalyst was obtained in the same manner as in Comparative Example 1, except that Pd was carried on the substrate after the upper layer was coated in Comparative Example 1.
The upper layer coat dried and calcined in Comparative Example 1 was allowed to adsorb a Pd solution, and unnecessary components were blown away using a blower to have Pd carried thereon at 0.055 g/l. The resultant was dried in a dryer maintained at 120° C. for 2 hours and then calcined in an electric furnace at 500° C. for 2 hours. Thus, the catalyst was obtained. An upper layer containing Rh and Pd was prepared as a consequence. In such a case, a pH level of the Pd solution was adjusted to 1 to 2, so that about 90% of Pd would be disposed in the surface layer.

Example 5

Lower layer: Pd (0.23)+ACZ (45)+$Al_2O_3$ (40)+Ba sulfate (5)+CZ (10)
Upper layer: Rh (0.11)+ACZ (100)+$Al_2O_3$ (30)+Pd (0.20)
The catalyst was obtained in the same manner as in Comparative Example 1, except that Pd was carried on the substrate after the upper layer was coated in Comparative Example 1.
The upper layer coat dried and calcined in Comparative Example 1 was allowed to adsorb a Pd solution, and unnecessary components were blown away using a blower to have Pd carried thereon at 0.20 g/l. The resultant was dried in a dryer maintained at 120° C. for 2 hours and then calcined in an electric furnace at 500° C. for 2 hours. Thus, the catalyst was obtained. An upper layer containing Rh and Pd was prepared as a consequence. In such a case, a pH level of the Pd solution was adjusted to 1 to 2, so that about 90% of Pd would be disposed in the surface layer.

<II. Method for Evaluation of Catalyst>

[II-1. Physical Property Evaluation]

Physical property evaluation was carried out by cutting catalysts (after the tolerance test) into pieces of given sizes, embedding the catalyst pieces in resin, polishing, vapor-depositing Au thereon, and evaluating the subjects using FE-EPMA (JXA-8530F, JEOL).

Specifically, the amount of Pd existing in the surface layer was determined by observing the catalyst coating layer using FE-EPMA, conducting Pd line analysis of a cross section of the catalyst coating layer in a thickness direction, multiplying the amount of Pd in the upper layer and the amount of the Pd element existing in the layer up to 50% of the upper layer in a thickness direction from the surface, and determining the amount of Pd existing in the upper half of the upper layer.

The ratio of Pd to Rh by mass (Pd/Rh) in the upper layer was determined on the basis of the proportion of the amount of Pd absorbed to the upper layer coat to the amount of Rh carried on the upper layer coat.

[II-2. Tolerance Test]

Catalysts were subjected to the tolerance test using actual engines. Specifically, the tolerance test was performed by mounting the catalysts on the exhaust systems of V-shaped 8-cylinder engines, and repeatedly applying exhaust gas in a stoichiometric atmosphere and in a lean atmosphere at given intervals over a period of 50 hours at catalyst bed temperature of 1,000° C.

[II-3. Property Evaluation]

Catalyst activity was evaluated using L-4 engines.

T50 Evaluation

The exhaust gas with the air-fuel ratio (A/F) of 14.4 (rich) was applied, and temperature-increasing properties (up to 500° C.) under high Ga conditions (Ga=35 g/s) were evaluated (SV=110,000 $hr^{-1}$). Catalyst activity was evaluated on the basis of the rate of purification when the temperature of the introduced gas reached 500° C.

<III. Results of Catalyst Evaluation>

The results of catalyst evaluation obtained as a result of [II-1. Physical property evaluation] and [II-3. Property evaluation] above are shown in Table 1.

TABLE 1

| | Location of Pd added in the upper layer | Percentage of Pd in the surface layer (mass %) | Pd/Rh ratio | About 500° C. NOx purification ratio (%) | About 500° C. HC purification ratio (%) | Amount of Pd in the upper layer (g/l) |
|---|---|---|---|---|---|---|
| Comp. Ex. 1 | Not added | 0 | 0.0 | 97.7 | 71.94 | 0 |
| Comp. Ex. 2 | Pd evenly added | 50 | 6.4 | 97.65 | 76.54 | 0.7 |
| Comp. Ex. 3 | Mainly in the surface layer | 89 | 10.9 | 96.75 | 83.29 | 1.20 |
| Comp. Ex. 4 | Pd evenly added | 50 | 0.5 | 98.4 | 72.28 | 0.055 |
| Comp. Ex. 5 | Pd evenly added | 50 | 1.8 | 98.2 | 73.85 | 0.20 |
| Ex. 1 | Mainly in the surface layer | 65 | 6.4 | 97.76 | 77.74 | 0.7 |
| Ex. 2 | Mainly in the surface layer | 89 | 6.4 | 98.05 | 81.22 | 0.7 |
| Ex. 3 | Mainly in the surface layer | 90 | 3.0 | 98.46 | 78.53 | 0.33 |
| Ex. 4 | Mainly in the surface layer | 92 | 0.5 | 98.6 | 73.96 | 0.055 |
| Ex. 5 | Mainly in the surface layer | 92 | 1.8 | 98.5 | 74.88 | 0.20 |

Figure 2:
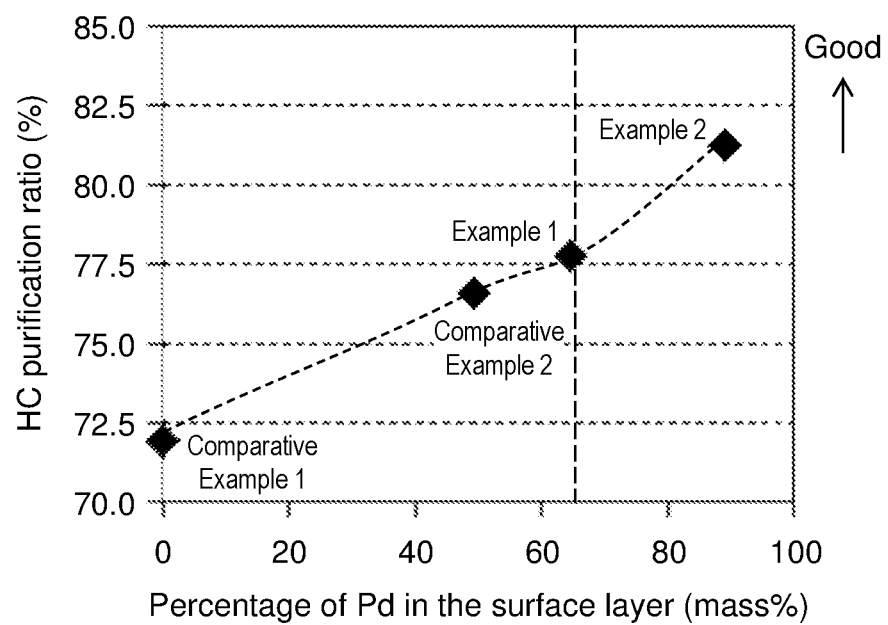
FIG. 2 shows a correlation between the amount of Pd existing in the surface layer and the HC purification ratio of Examples 1 and 2 and Comparative Examples 1 and 2 after the tolerance test.
Figure 3:
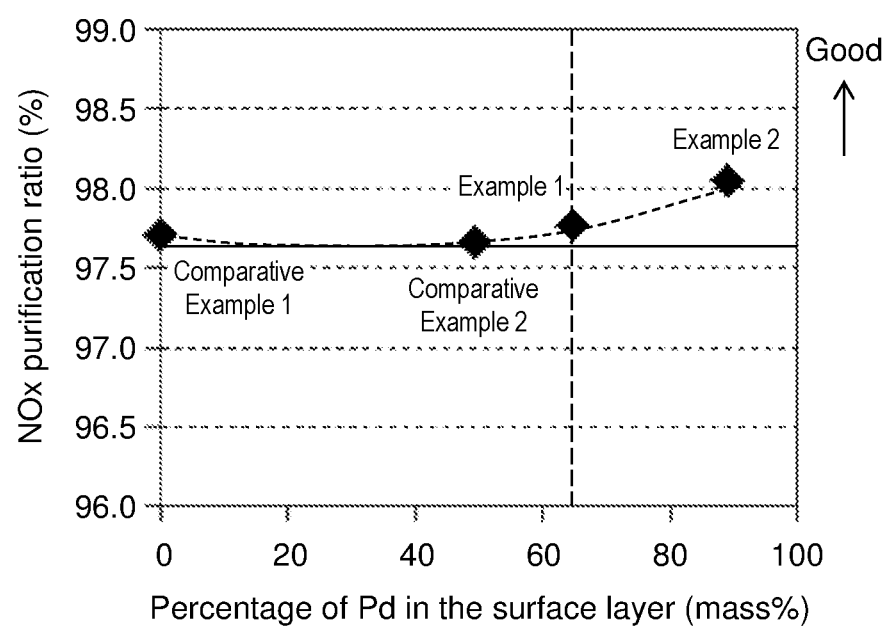
FIG. 3 shows a correlation between the amount of Pd existing in the surface layer and the NOx purification ratio of Examples 1 and 2 and Comparative Examples 1 and 2 after the tolerance test.

FIG. 2 shows the correlation between the amount of Pd disposed in the surface layer and the HC purification ratio of Examples 1 and 2 and Comparative Examples 1 and 2 after the tolerance test. FIG. 3 shows the correlation between the amount of Pd disposed in the surface layer and the NOx purification ratio of Examples 1 and 2 and Comparative Examples 1 and 2 after the tolerance test. As is apparent from FIG. 2 and FIG. 3, the NOx purification ratio and the HC purification ratio are improved as the amount of Pd disposed in the surface layer is increased. When the amount of Pd disposed in the surface layer is 65% by mass or more, specifically, the excellent NOx purification capacity and the excellent HC purification capacity can be achieved for the following reasons. That is, Pd is mainly disposed in the surface layer of the upper layer, an area in which both Pd and Rh are disposed is small, and NOx deterioration can thus be reduced.

Figure 4:
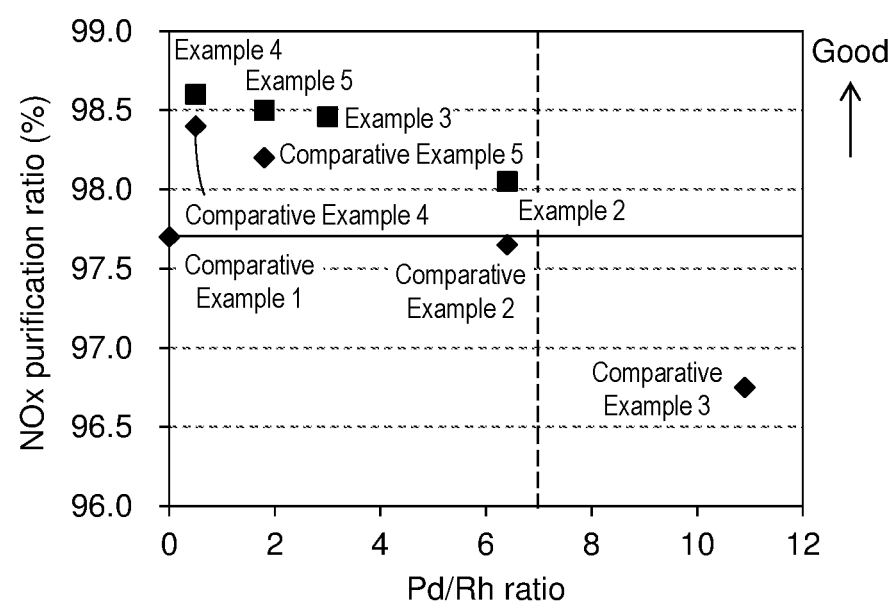
FIG. 4 shows a correlation between the Pd/Rh ratio and the NOx purification ratio of Examples 2 to 5 and Comparative Examples 1 to 5 after the tolerance test.

FIG. 4 shows the correlation between the Pd/Rh ratio and the NOx purification ratio of Examples 2 to 5 and Comparative Examples 1 to 5 after the tolerance test. As is apparent from FIG. 4, the NOx purification ratio is improved as the Pd/Rh ratio is reduced. When the Pd/Rh ratio is 0.5 to 7.0, the NOx purification ratio is improved, compared with Comparative Example 1 and corresponding comparative examples in which the amount of Pd in the upper layer is the same.

Figure 5:
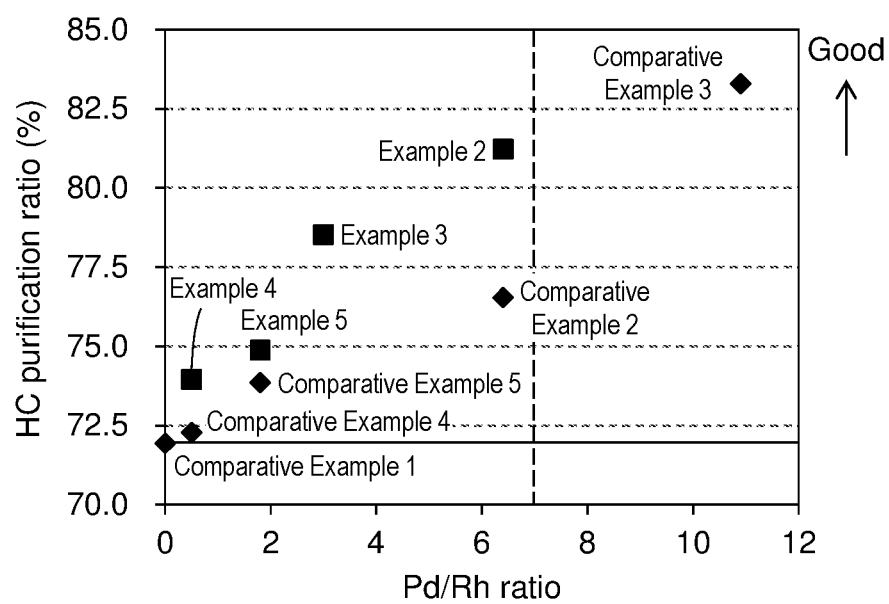
FIG. 5 shows a correlation between the Pd/Rh ratio and the HC purification ratio of Examples 2 to 5 and Comparative Examples 1 to 5 after the tolerance test.

FIG. 5 shows the correlation between the Pd/Rh ratio and the HC purification ratio of Examples 2 to 5 and Comparative Examples 1 to 5 after the tolerance test. When the Pd/Rh ratio is 0.5 to 7.0, as shown in FIG. 5, the HC purification ratio is improved, compared with Comparative Example 1 and corresponding comparative examples in which the amount of Pd in the upper layer is the same.

DESCRIPTION OF SYMBOLS

1: The catalyst of this disclosure
11: A substrate
12: A catalyst coating layer
13: A lower layer
14: An upper layer
15: A layer up to 50% of the upper layer in a thickness direction from the surface of the upper layer being relatively remote from the surface of the substrate (the surface layer)
16: A layer up to 50% of the upper layer in a thickness direction from the surface of the upper layer being relatively closer to the surface of the substrate

INDUSTRIAL APPLICABILITY

The exhaust gas purification catalyst of this disclosure can be particularly preferable for an exhaust gas purification catalyst of an automobile.

What is claimed is:

1. An exhaust gas purification catalyst comprising a substrate and a catalyst coating layer formed on the surface of the substrate,
    wherein the catalyst coating layer comprises the upper and lower layer comprising a lower layer being closer to the surface of the substrate and an upper layer being relatively remote from the surface of the substrate,
    the upper layer of the catalyst coating layer comprises Rh and Pd, and a carrier,
    the lower layer of the catalyst coating layer comprises at least one noble metal selected from Pd and Pt, and a carrier,
    65% by mass or more of Pd in the upper layer exists in a layer up to 50% of the upper layer in a thickness direction from the surface of the upper layer being relatively remote from the surface of the substrate, and
    the ratio of Pd to Rh by mass (Pd/Rh) in the upper layer is 0.5 to 7.0.

2. The exhaust gas purification catalyst according to claim 1, wherein 85% by mass or more of Pd in the upper layer exists in a layer up to 50% of the upper layer in a thickness direction from the surface of the upper layer being relatively remote from the surface of the substrate.

* * * * *